C. KÄUFER & F. SCHOPPE.
APPARATUS FOR SPREADING MATERIALS ON EDIBLES, SUCH AS CAKE, BISCUIT, AND THE LIKE.
APPLICATION FILED OCT. 19, 1908.
934,817.
Patented Sept. 21, 1909.
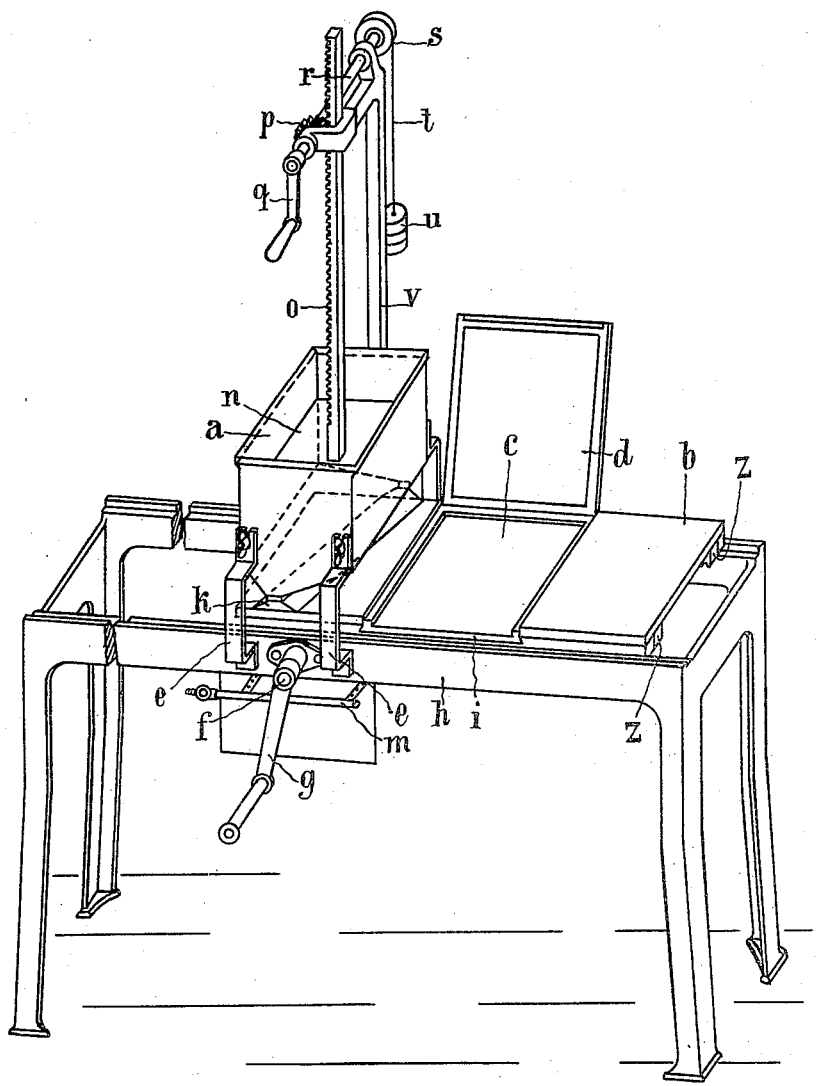

UNITED STATES PATENT OFFICE.

CARL KÄUFER AND FRITZ SCHOPPE, OF HANOVER, GERMANY.

APPARATUS FOR SPREADING MATERIALS ON EDIBLES, SUCH AS CAKE, BISCUIT, AND THE LIKE.

934,817.   Specification of Letters Patent.   Patented Sept. 21, 1909.

Application filed October 19, 1908.   Serial No. 458,433.

*To all whom it may concern:*

Be it known that we, CARL KÄUFER, electrician, and FRITZ SCHOPPE, merchant, subjects of the Kingdom of Prussia, and residents, respectively, of 18 Am Kanonenwall, Hanover, and of 2 Volgersweg, Hanover, Kingdom of Prussia, in the German Empire, have invented new and useful Improvements in Apparatus for Spreading Materials on Edibles, Such as Cake, Biscuit, and the Like, of which the following is a specification.

The present invention relates to an apparatus which has for its object to permit of mechanically spreading materials on edibles such as cake, biscuits or the like, which operation has hitherto been effected by means of spreading blades.

In the accompanying drawing which illustrates the invention the apparatus is shown in perspective.

Referring to the drawing, the box $a$ is filled with the material to be spread, and a slide $b$ serving to receive the cake, biscuit or the like to be covered with said material, is arranged to move longitudinally of the table $h$ below said box. The cake, biscuit or the like is placed into the recess $c$ of the removable section $i$ of slide $b$ and retained therein by means of the frame $d$ hingedly secured to the section $i$. In the drawing this frame $d$ is shown opened. The section $i$ and the frame $d$ being removable, it is possible to employ sections of various sizes with their respective frames corresponding with the different sizes of cake, biscuit or the like to be covered. The slide $b$ is provided on its underside with racks $z$ in which engage pinions (not shown) fitted to the shaft $f$. By turning the shaft $f$ by means of a crank $g$ the slide $b$ will be moved, together with the cake, biscuit or the like to be covered, beneath the box $a$. By this operation the cake, biscuit or the like is covered with the material contained in the box $a$ which emerges through a slot provided in the bottom of said box $a$. After the frame $d$ has been opened, the newly spread cake, biscuit or the like may be removed. For this purpose the recess is open in front while the frame $d$ is provided with a projecting strip which lies in front of the cake, biscuit or the like when the latter is in position and the frame closed, thus preventing the cake, biscuit or the like from moving. After a fresh cake, biscuit or the like has been placed into the frame, a reverse operation of the crank moves the slide $b$ back into its original position.

The uniform, even spreading of the material contained in the box $a$ is insured by the design of this box and the arrangement of the spreading blades $k$. The blades which may be either rigidly or detachably fitted to the box $a$ are so arranged that their double inclination will correspond with the natural manner of manually spreading during both the forward and return motion of the slide. In order to prevent the material to be spread from moving to the side owing to the slanting position of the blades, the base of the box $a$ has a variable incline toward the discharge slot, whereby a greater or lesser feed of the material contained therein is obtained. The apparatus is supported by the table $h$.

A gas or spirit flame or heating device $m$ provided centrally below the table $h$ serves to prevent substances to be spread which contain fat from setting. The slide $b$ together with box $a$ is thereby slightly heated. The box $a$ is secured by means of clamps $e$ in an easily detachable manner to the table $h$.

When very viscous material is being used, it will be of advantage to employ an automatically acting pressure device. This comprises a shaft $r$ on which a gear $p$ is keyed. At the rear of this shaft $r$ is fitted a small pulley $s$ around which a few turns of a cord or wire cable $t$ are coiled. The free end of the cord or cable $t$ carries a weight $u$ which is composed of various sections and can be increased at will. The descent of this weight under the influence of gravity will effect a rotation of the shaft $r$ and the gear $p$. The latter will move the rack $o$ and the pressure plate $n$ downward into the box $a$ containing the viscous material. When this plate $n$ has reached its lowermost position, or when the box $a$ requires to be refilled, by turning the crank $q$ the plate $n$ will be raised and at the same time the weight $u$ will be wound up. The bracket $v$ supporting this pressure device is screwed or otherwise secured to the back of the table $h$.

The apparatus may be constructed in various sizes according to the various sizes of the cakes, biscuits or the like to be covered. The capacity of the apparatus may be increased by making the table $h$ and the plate $b$ longer and also by increasing the number of the boxes $a$ in which instance of course the employment of a power drive would be necessitated.

Having now described our invention what we claim and desire to secure by Letters Patent of the United States is:

1. An apparatus for mechanically spreading material on cake, biscuit or the like, comprising a receptacle holding said material provided with an opening in its bottom through which the material is adapted to pass, means for forcing said material through the opening, a spreader attached to the under side of said receptacle, and a slide movable beneath said spreaders and provided with a recess for the reception of the article to be covered and a frame adapted to hold said article in said recess.

2. An apparatus for mechanically spreading material on cake, biscuit or the like comprising a box for holding said material provided with a feed opening in its under side and means for forcing said material through said feed opening, spreaders attached to the under side of said box, a slide arranged to be moved longitudinally beneath said spreaders and a removable support for the article to be coated carried by said slide, and having a frame hinged thereon to hold said article in place on said support.

3. An apparatus for mechanically spreading material on cake, biscuit and the like, comprising a table, a receptacle for holding the material to be spread adjustably attached to said table and provided with a feed opening in its under side, a spreader attached to the bottom of said receptacle, a slide mounted on its said table and adapted to move longitudinally thereof beneath said spreaders, and a support for the article to be coated removably carried by said slide, said support having a recess therein for the article and a frame hinged at one end to fold over said article for retaining it in place on said support.

4. An apparatus for mechanically spreading material on cake, biscuit or the like comprising a receptacle for containing said material having a feed opening in its under side, a spreader rigidly attached to the bottom of said receptacle and disposed at an angle to the sides thereof, a slide provided with a rack on its under side, means engaging said rack for moving the slide to and fro beneath said spreader, and a recessed support for the article to be spread, provided with a hinged open frame to be closed over said article, said frame having a depending flange on its free end for preventing the article from leaving its support during the movement of the slide.

5. In an apparatus for mechanically spreading material on cake, biscuit and the like, a receptacle for holding said material and provided with a feed opening in its under side, a spreader attached to said receptacle and angularly disposed thereto, a slide arranged to be moved to and fro beneath said receptacle, and a support for the article to be coated carried by said slide and adapted to be removed therefrom for the substitution of supports adapted to receive articles of different sizes and shapes.

6. An apparatus for spreading material on cake, biscuits and the like provided with a slide having a transverse slot extending across the same and a support for the article to be covered fitted to said slot, said support having a recess therein opened at one side, and an open frame hinged to the support opposite the unclosed side of the recess and provided on its free end which enters said open side when the frame is folded over the support.

Signed and subscribed in presence of two undersigning witnesses, this 12th day of September, 1908.

CARL KÄUFER.
FRITZ SCHOPPE.

Witnesses:
HENIE SCHOPPE,
AUGUST SONNENBURG.